United States Patent [19]

Outtier

[11] 3,984,966
[45] Oct. 12, 1976

[54] HARVESTING MACHINE EQUIPPED WITH A STALK CUTTER

[75] Inventor: Raymond M. C. Outtier, Willems, France

[73] Assignee: International Harvester Company, Chicago, Ill.

[22] Filed: June 27, 1975

[21] Appl. No.: 590,907

[30] Foreign Application Priority Data
June 27, 1974 France .............................. 74.22435

[52] U.S. Cl. .................................. 56/10.2; 56/503
[51] Int. Cl.² ............................................ A01D 75/28
[58] Field of Search .............. 56/10.2, 503, 53, 500, 56/14.9, 15.2, 15.9, DIG. 10, DIG. 15

[56] References Cited
UNITED STATES PATENTS

| | | | |
|---|---|---|---|
| 2,972,847 | 2/1961 | Matthews, Jr. .................. | 56/10.2 |
| 3,293,835 | 12/1966 | Gehman et al. ................. | 56/15.2 |
| 3,402,540 | 9/1968 | Karlsson et al. ................ | 56/10.2 |

*Primary Examiner*—Robert Peshock
*Assistant Examiner*—James D. Hamilton
*Attorney, Agent, or Firm*—Raymond E. Parks; Floyd B. Harman

[57] ABSTRACT

There is provided a rotary corn stalk cutter for use as an attachment on a combine type of harvesting machine which is equipped with a vertically inclined corn head and platform. The cutter includes a housing which is dependingly attached to the bottom of the platform in the open space between two successive row divider points. A telescopic linkage is provided for adjusting the attitude of the cutter housing in order to maintain the knives of the cutter in parallel relationship with the ground regardless of the angular position of the corn head and platform. A ledger blade in combination with the cutter knives is provided for comminutating the cut stalks and an opening is provided in the housing for discharging the chopped material rearwardly of the direction of travel of the combine.

10 Claims, 8 Drawing Figures

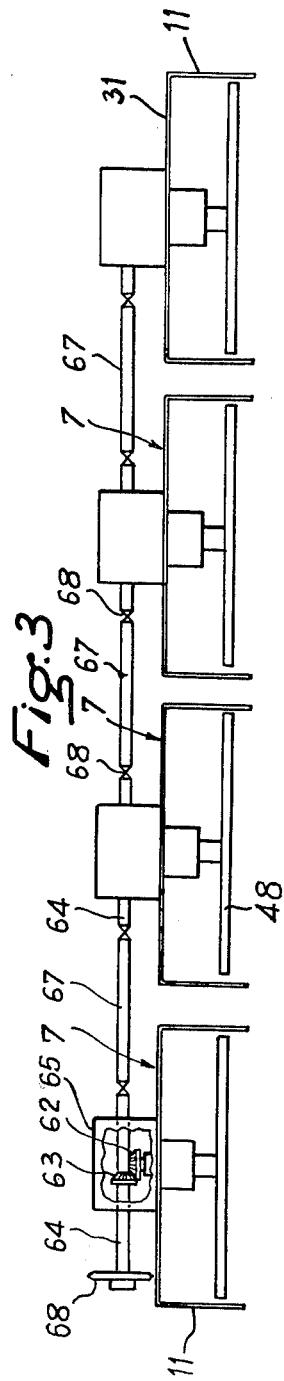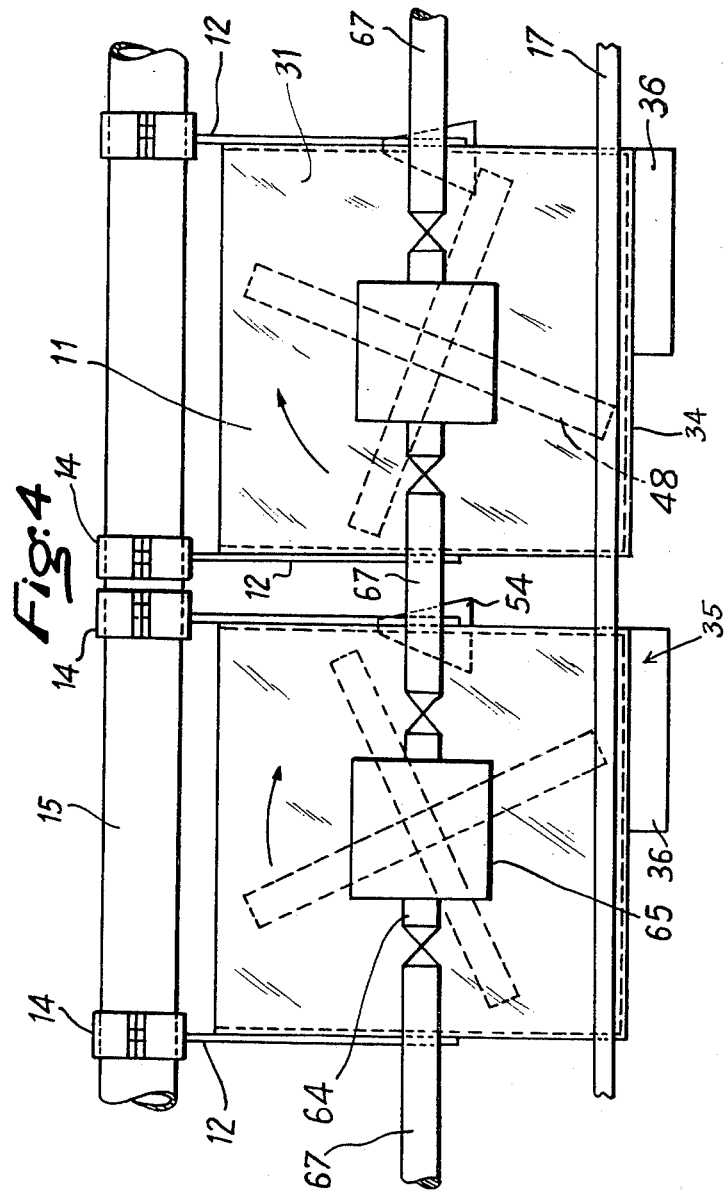

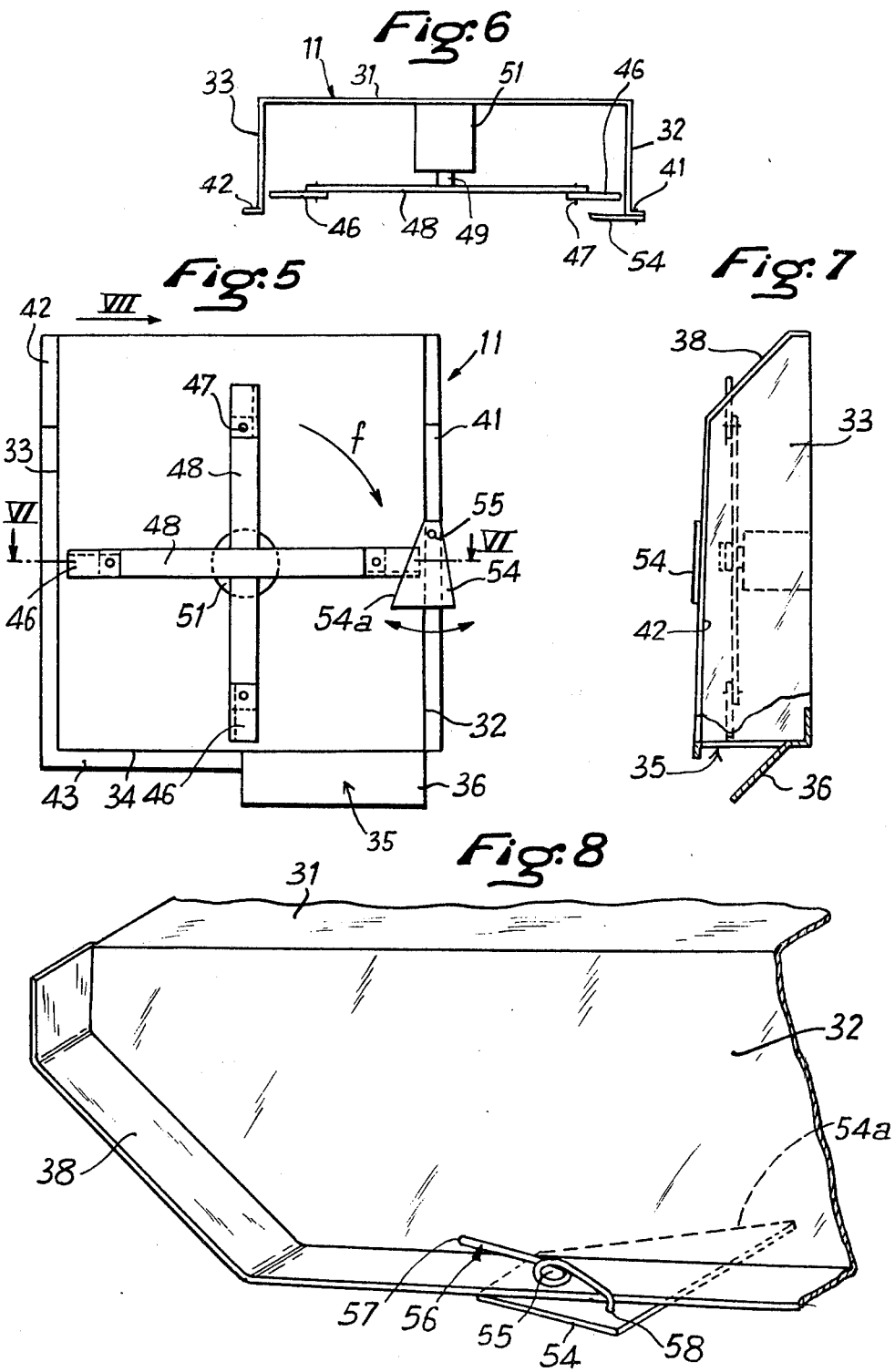

HARVESTING MACHINE EQUIPPED WITH A STALK CUTTER

BACKGROUND OF THE INVENTION

This invention relates to a harvesting machine, in particular to a combine type of harvester which is equipped with a vertically inclined corn head and platform. More particularly, the invention concerns a corn stalk cutter which is mounted below the platform in the space between the row crop dividers of the corn head.

DESCRIPTION OF THE PRIOR ART

In the French Patent No. 71.06296 (U.S. Pat. No. 2,083,951), published on Nov. 2, 1971, with a priority filing date of Mar. 13, 1970 based on German patent application No. P-20 11 976.0, the housing or casing of the rotary corn stalk cutter is provided with a ground engaging shoe which slides along the ground in such a manner as to follow surface irregularities so that the device cannot be employed in muddy or very uneven terrain because the knives are liable to strike the ground. Furthermore, during changes in the direction of travel of the combine, the mounting for the cutter housing is subjected to very high transverse stresses.

Another corn stalk cutter is shown in the German Published Patent Application No. 20 54 585, published on May 25, 1972. In this publication, the cutter is firmly secured to the bottom of the corn head and platform. The characteristic of this arrangement is that the attitude of the cutter varies with the angular positioning of the corn head and platform during a corn picking operation so that the corn stalks are cut off at various heights along the rows in the field producing undulating rows of stubs.

SUMMARY OF THE INVENTION

An object of this invention is to provide a corn stalk cutter attachment for a combine type of harvester in which the housing or casing of the corn stalk cutter is pivotally mounted at its leading side to the bottom of the vertically inclined corn head and platform. The trailing side is connected by means of an adjustable link to the operator's station in the combine. Thus, the operator can vary the attitude of the cutter from his cab in accordance with the angular position of the corn head and platform during a corn picking operation. The trailing end of the cutter can be adjusted about the horizontal transverse pivot axis to maintain the rotor cutter blade arms of the cutter in parallel relationship with the ground and at a practically constant distance above ground irrespective of the angular position of the corn head and platform. By virtue of this arrangement, the vertical distance or elevation of the stalk cutter blades from the ground is readily adjusted from the operator's deck of the combine; and this particular arrangement also makes it possible to obtain a sufficient ground clearance when the corn head and platform is raised to a transport position. Thus, the invention overcomes the aforementioned disadvantages of the shoe type stalk cutter systems which slide along the ground and the fixed stalk cutter systems which are fixed to the snapping platform without any provision for height adjustment as a function of the working height of said platform. The invention makes it possible to maintain a substantially constant ground clearance in respect of all working heights of the snapping platform. It is thus possible to prevent damage to stalk cutting knives as a result of contact with the ground and to prevent damage to the cutter housing and mounting therefor due to transverse stresses during a change in the direction of travel of the combine. Furthermore, with this invention it is possible to tilt the stalk cutter to an inclined position where the rotor blades are ineffective to cut the corn stalks when it is desired to harvest the crop without cutting the stalks.

Another object of the invention is to provide limiting support means which prevents the trailing side of the cutter from dropping below a predetermined clearance height above the ground and relieves a portion of the weight of the cutter off the adjustable link. This object is attained by a tension spring connection of the trailing end of the cutter to the corn head and platform which is in parallel with the adjustable link connection. The drop limit feature is obtained by a link of a fixed length which also connects the trailing end of the cutter to the platform and limits the length that the spring can stretch.

And a still further object is to provide means for comminutating the cut corn stalks so that the small pieces fall back to the ground and decompose more readily and are more readily plowed under the surface of the soil. This object is obtained by the provision of a ledger blade on the cutter housing which cooperates with the cutter knives on the rotor arms of the cutter. The cut stalks are drawn into the housing and are shredded to pieces by the blade and knives, and the pieces are deposited rearwardly to the direction of travel of the combine through an opening provided in the trailing wall of the cutter housing. Another feature of the ledger blade is that means are provided for automatically pivoting the blade in order to clear obstructions.

With the above objects in mind there is provided in a combine type of harvesting machine which has a corn head and a platform pivotally mounted below the operator's station, a depending stalk cutter which is carried between two successive row divider points. The stalk cutter has a housing which comprises closed top and parallel side walls, open front and bottom sides and includes a rear wall which has a discharge opening. A cutter rotor is rotatably mounted in the housing and has knives rotatable on a plane substantially parallel with a second plane passing through the open bottom side. A transverse shaft is carried on the bottom of the corn head and platform and a pair of axially spaced swinging arms are mounted thereto. The side walls of the housing are pivotally mounted to the swinging ends of the arms. An attitude adjustment means is end connected respectively to the housing and to the combine for swinging the housing about the axis of its pivotal connection to the arms to set the inclination of the plane of the knives with respect to the ground. A first support means resiliently connects the housing to the corn head and platform rearwardly of its pivotal connection to the arms and a second support means also connects the housing to the corn head and platform and limits the length of the first support means and then supports the housing after the limit is reached. And there is a ledger blade which is carried on the bottom of one of the side walls which is adapted to cooperate with the knives for comminutating the stalk after being cut by the knives.

BRIEF DESCRIPTION OF THE DRAWING

In order that the invention and objects thereof may be readily understood and put into practice, reference will now be made to the various figures of the drawing in which:

FIG. 3 is a front view of a chain or plurality of stalk cutters shown removed from the bottom of the platform for use with a four row corn head;

FIG. 4 is an enlarged plan view showing two successive stalk cutters;

FIG. 5 is a bottom view of one stalk cutter such as shown in any one of the preceeding figures;

FIG. 6 is a sectional view taken along line VI—VI of the stalk cutter shown in FIG. 5;

FIG. 7 is a partially cut away side view viewed in the direction of the arrow VII of the stalk cutter in FIG. 5; and FIG. 8 is a partial perspective view of a stalk cutter ledger blade.

DESCRIPTION OF THE PREFERRED EMBODIMENT

Figure 1:
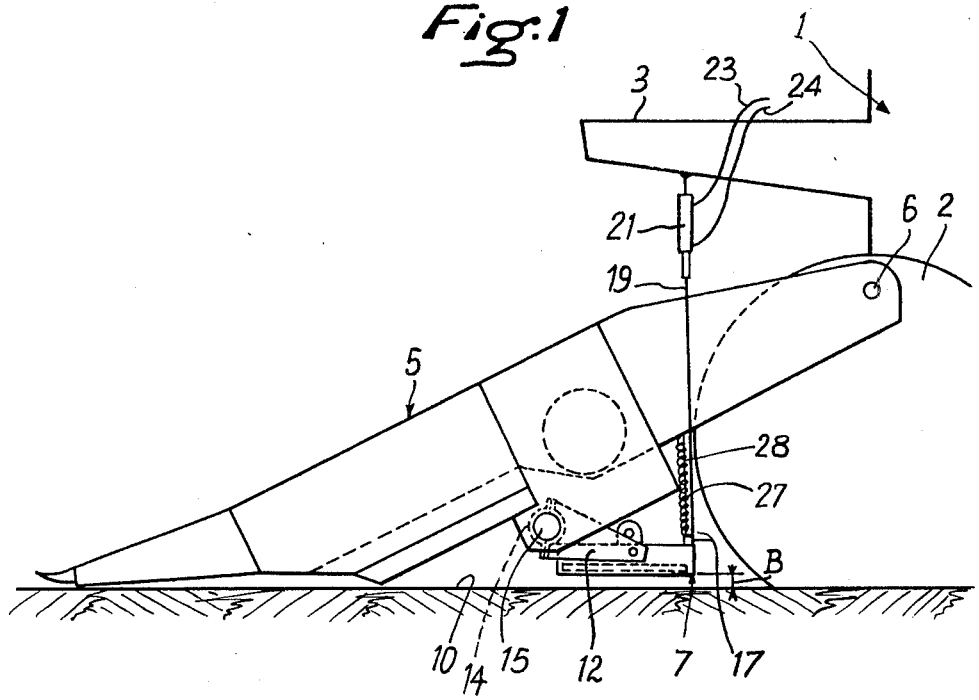
FIGS. 1 and 2 are side views showing the front end of a harvesting machine such as a combine to which is attached a corn head and platform. A corn stalk cutter is shown attached to the bottom of the corn head and platform and is shown in two different angular positions of the rotor knives with respect to the ground.

A more complete understanding of the invention will be gained from the description to follow and with reference to the various figures of the drawing wherein a harvesting machine such as a combine 1 is shown symbolically in FIG. 1. On the front portion of the machine there are front wheels 2 and an operator's deck or station 3. A corn head and snapping platform 5 is pivotally mounted to the front end of the combine 1 on a horizontal cross pin 6. The corn head may be of any choice such as two, three and four row corn heads and accordingly carries a certain number of corn stalk cutters 7 corresponding to the number of rows. Each stalk cutter 7 comprises a casing or housing 11. The housing 11 is substantially parallelepipedal in shape, as viewed from the top and bottom, is rigidly fixed to two lateral arms 12 which are fitted with collars 14. The collars 14 permit pivotal movement of the trailing end of the casing about a horizontal transverse axis as defined by the tubular horizontal cross shaft 15 which is carried by the corn head snapping platform 5. Shaft 15 is positioned in front of the housing 11 with respect to the forward direction of motion of the harvester 1. The rear of trailing portions of all the housings shown in FIGS. 3 and 4 are connected to each other by means of a cross member or elongated bar 17 to which is attached the lower end of a connecting link member 19 of adjustable length. In this example, the connecting link member 19 is a flexible cable and a telescopically movable hydraulic piston cylinder unit 21, the upper extremity of which is attached to the operator's deck 3 of the harvester 1. This constitutes the means for adjusting the attitude of the cutter. In FIG. 1, the references 23 and 24 designate two hydraulic fluid lines which serve to selectively supply one end of the hydraulic jack 21 with fluid and to discharge the fluid in the other end to a collector tank or reservoir (not shown) in order to initiate either an extension or retraction of the piston in the cylinder. The operation of the hydraulic jack 21 is controlled from the operator's deck 3.

Figure 2:
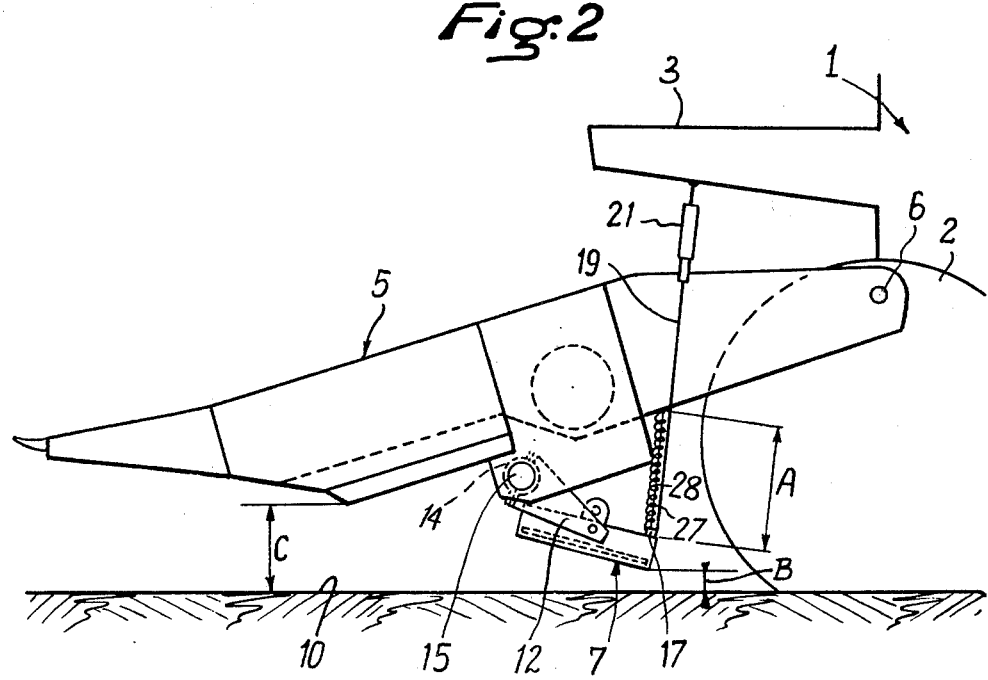

In order to ensure that the cable 19 of the cutter attitude adjustment means does not have to withstand an excessive proportion of the weight of the stalk cutter 7, the cross member 17 is also connected to the corn head snapping platform 5 by a parallel resilient support means comprising a spring 27 within which is placed a rigid rod or a flexible cable 28 for limiting the elongation or extension of the spring 27 to a length designated by "A" in FIG. 2. Thus, from the moment when the corn head snapping platform 5 reaches the maximum working height designated "C" in FIG. 2, the rod or cable 28 prevents the spring 27 from extending further and holds the cutter 7 at the maximum length "A" of the rod or cable 28. The stressed cable 19 is relieved of a portion of the weight of cutter 7 by the rod or cable 28 in this condition. Upon further extension of the jack 21, the trailing end of the cutter will be entirely supported by the rod or cable 28 which is fixed to the snapping platform 5. By continuing to lift the snapping platform to a higher elevated position for purposes of transportation, the ground clearance shown as "B" in FIGS. 1 and 2, of the stalk cutter 7, is accordingly increased.

Each housing or casing 11, as shown in FIGS. 4 to 7, has a solid rectangular top wall 31, two solid lateral or side walls 32, 33 and a rear or trailing wall 34. The trailing wall 34 is partially closed over one-half of its length and height. As shown in the example in FIGS. 4 to 7 the left-hand half of the rear wall 34 is closed and the right-hand half has an opening 35 which is protected by an inclined hood 36. The hood 36 is formed by the cut out portion of the rear wall 34. The hood may also be formed by an inclined extension of the top surface 31 of the housing 11 or by a piece of sheet metal attached to either the top or rear walls. The leading or front ends of the two lateral or side walls 32, 33 are downwardly inclined towards the rear forming shoes as shown at 38 in FIG. 7. Finally, the bottom edges of the lateral or side walls 32, 33 are turned horizontally outwards so as to form two flanges 41, 42 respectively. Similarly, the closed half portion of the rear wall 34 is provided with a horizontal edge 43 which projects rearwardly with respect to the direction of travel. The housing 11 is completely open at the front or leading side and at the bottom and partially open at the back or trailing side and the flanges thus enhancing the rigidity of the housing 11.

The active elements of the stalk cutter are two pairs of knives 46. One pair each is pivotally mounted by means of pins 47 on the opposite ends of a pair of cross bar arms 48. The arms 48 are fixed to the lower end of a vertical power shaft 49 which is rotatably mounted within a hub 51 that is connected to the inner surface of the top wall 31. In the example shown, the cutter rotor comprises two crossed arms 48 and consequently four knives. The rotary path of the knives 46, during the rotation of the shaft 49, passes in the vicinity of the bottom edges of the casing 11.

A ledger blade means 54 is shown in FIGS. 5, 6 and 8, which has a generally triangular shape and cooperates with the rotor knives 46. The ledger blade means 54 is pivotally mounted by means of a pin 55 to the bottom flange 41 of the lateral or side wall 32. In the example shown in FIGS. 5, 6 and 8, the blade 54 is mounted on the right-hand side of the casing 11 i.e. on the lateral wall 32 which is adjacent to the opening 35 in the rear or trailing wall 43 of the housing 11. In this region, the knives rotate towards the rearward wall 34, in the direction of the arrow $f$ shown in FIG. 5. The ledger blade 54 is urged towards the interior of the housing by a piano wire type of spring 56, shown in FIG. 8 which is wound around the pivot pin 55 of the ledger blade 54. One end 57 of the ledger spring 56 is applied against the lateral or side wall 32 of the casing 11 whilst the other end 58 of the spring is bent back and inserted into a hole provided for this purpose in the ledger blade 54.

The rotary power shaft 49 of each stalk cutter is connected by a pair of gears or pinions 62, 63 shown in FIG. 3, to a horizontal cross shaft 64 rotatably mounted within a transfer case or box 65 which is fixed on top outer surface of each casing 11. The shafts 64, which drive the assembly of stalk cutters shown, are connected to each other by intermediate shafts 67. Universal joint assemblies 68, such as cardan type of couplings, couple shafts 64 to the intermediate shafts 67. The first shafts 64 of the first stalk cutter is connected to any suitable power take-off source from the combine harvester, for example by means of a chain (not shown) which passes over a sprocket gear 68 fixed on the first shaft 64.

The operation of the stalk cutting device will now be described. For any angular operating position of the vertically inclined corn head and platform 5, as shown by way of example in FIGS. 1 and 2, the ground clearance "B" of the stalk-cutters, or elevation of the stalk cutters above ground level, is determined by the extent or length of the adjusting hydraulic jack 21. The operator can selectively adjust the rearward end of the stalk cutter by operating the jack 21 and thus set the height cutter by operating the jack 21 and thus set the height of the cut stalks. An inclined cutter is preferred for heavy growth and a level cutter for a normal growth.

The knives 46 are rotated by the rotar cross arms 48, which are carried by the vertical rotary power shafts 49, and cooperate with the ledger blade 54 to comminutate the cut stalks. If the ledger blade is subjected to an excessive stress by an over abundance of cut stalks, it withdraws or swings rearwardly and outwardly from the side of the housing in opposition to the force of the spring 56 and then returns to its normal position inside the casing either after the knives carry away the excess cut stalks or fling it from the housing through the opening 35. In the normal work position, the cutting edge 54a, of the ledger blade 54 is rearwardly inclined towards the longitudinal mid-plane of the casing of the stalk cutter.

The stalks, after they are cut, are propelled into the casing and are chopped up between the knives 46 and the ledger blade 54. The comminutated material is then discharged or ejected through the opening 35 in the back of the casing.

It is to be understood that the invention is not limited to the form of construction which has been described, with reference to the figures in the accompanying drawing, and that modifications can be made without departing either from the scope or the spirit of the invention.

The embodiments of the invention in which an exclusive property of privilege is claimed are defined as follows:

1. In a combine type of harvesting machine having a corn head and platform pivotally mounted below an operator's station and the corn head having a depending stalk cutter carried between two successive row divider points, and the stalk cutter having a housing comprising closed top and parallel side walls and an open front and bottom sides and including a rear wall having a discharge opening, and a cutter rotor rotatably mounted in the housing and having knives rotatable on a plane substantially parallel with a second plane passing through the open bottom side of the housing, wherein the improvement comprises:
   a transverse shaft carried on the bottom side of the corn head and platform;
   a pair of axially spaced swinging arms mounted to the shaft, the side walls of the housing pivotally mounted to the swinging end of the arms;
   an attitude adjustment means having one end connected to the housing and an opposite end connected to the combine for swinging and housing about the axis of its pivotal connection to the arms and selecting the inclination of the plane of the knives with respect to the ground;
   a first support means being a stretchable link connecting the housing rearwardly of its pivotal connection to the arms to the corn head and platform;
   a second support means being a non-stretchable link of a predetermined length connected in parallel with the first support means for limiting the elongation of the first support means and for supporting the housing at the point of the limited elongation; and
   a ledger blade means carried on the bottom of one of the side walls adapted to cooperate with the knives for comminutating the stalk cut by the knives.

2. The invention as claimed in claim 1 wherein, the attitude adjustment means comprise a first cable of a determined length and a hydraulic piston cylinder unit, one end of the cable being attached to the housing and the second end being attached to an end of the piston cylinder unit and the opposite end of the piston cylinder unit being attached to the combine.

3. The invention as claimed in claim 1 wherein, the first support means comprise a tension spring having one end connected to the housing and the opposite end connected to the corn head and platform;
   and the second support means comprise a cable of the predetermined length connected at one end to the housing and at the other end to the corn head and platform.

4. The invention as claimed in claim 3 wherein, the cable is coaxial with the tension spring.

5. The invention as claimed in claim 2 wherein the first and second support means are connected to the housng adjacent the connection of the cable to the housing.

6. The invention as claimed in claim 5 wherein the first support means comprise a tension spring having one end connected to the housing and a second end connected to the corn head and platform; and
   the second means comprise a second cable of the predetermined length connected at one end to the housing and at the other end to the corn head and platform.

7. The invention as claimed in claim 6 wherein, the second cable is coaxial with the tension spring.

8. The invention as claimed in claim 1 wherein the discharged opening is located adjacent the one wall which carries the ledger blade means and cutter rotor is arranged to rotate in the direction towards the ledger blade.

9. The invention as claimed in claim 8 wherein the ledger blade means is pivotally mounted to the one wall and is swingable rearwardly and outwardly from the housing; and further including spring means for swinging the ledger blade means back into the housing.

10. The invention according to claim 1 wherein the attitude adjustment means comprise a first cable of a determined length and a hydraulically adjustable jack, one end of the cable and jack connected together and the distal ends thereof connected respectively to the housing and combine; and the first support means comprise a tension spring connected at opposite ends respectively to the housing and to the corn head and platform; and a second support means comprise a second cable of the predetermined length connected at opposite ends respectively to the housing and to the corn head and platform; and the ledger blade means being pivotally mounted to the one wall and swingable rearwardly and outwardly from the housing and including spring means for swinging the ledger blade means back into the housing; and the cutter rotor being arranged to rotate in the direction towards the ledger blade; and the discharge opening being located in the rear wall adjacent the one wall.

* * * * *